Aug. 13, 1929.  E. A. FERRIS  1,724,010
SAWMILL DOG
Original Filed April 16, 1925
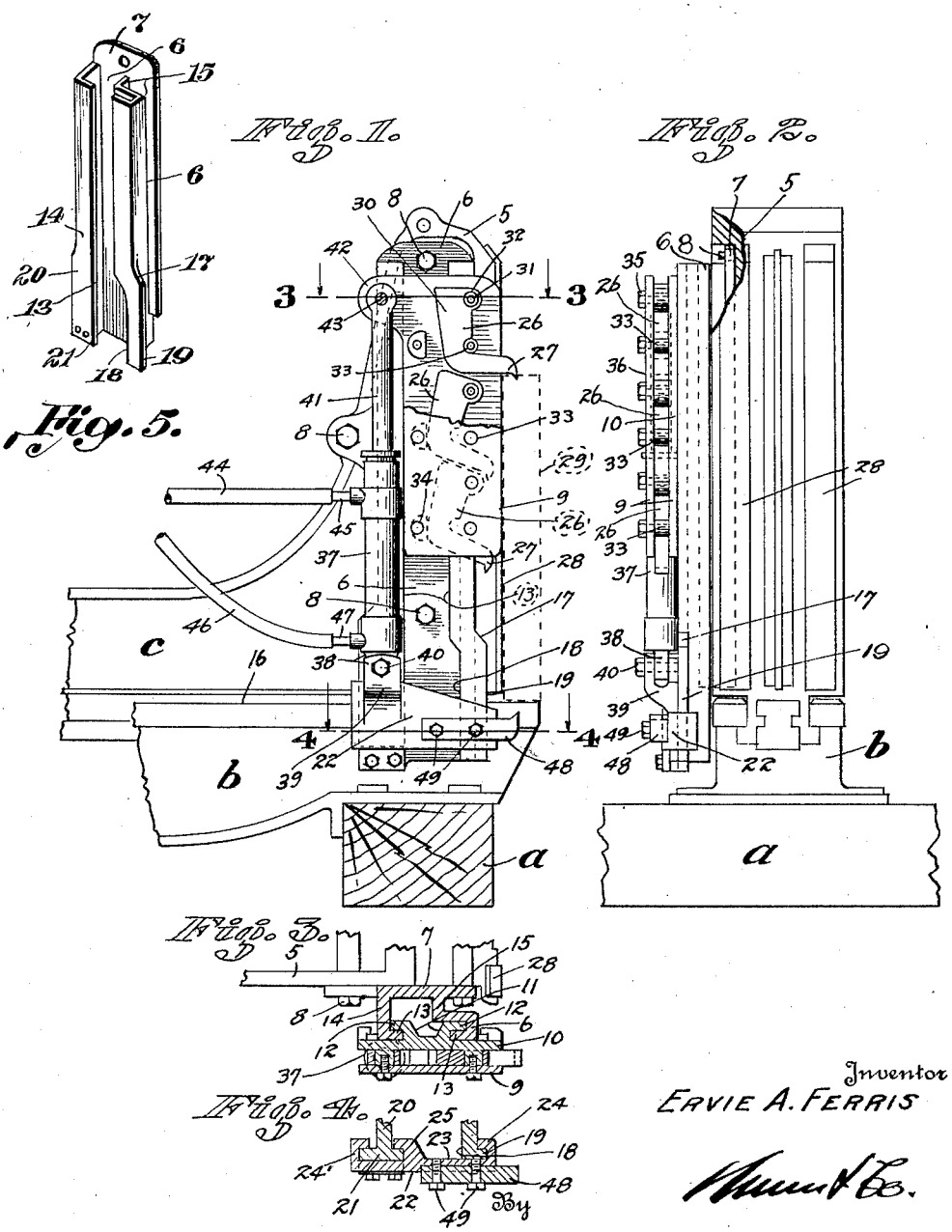
Inventor
ERVIE A. FERRIS
Attorneys Patented Aug. 13, 1929.

1,724,010

UNITED STATES PATENT OFFICE.

ERVIE A. FERRIS, OF WESTWOOD, CALIFORNIA, ASSIGNOR TO MARTIN AIR DOG COMPANY, OF SAN FRANCISCO, CALIFORNIA, A CORPORATION OF CALIFORNIA.

SAWMILL DOG.

Application filed April 16, 1925, Serial No. 23,616. Renewed November 3, 1928.

The present invention relates to improvements in saw mill dogs, and has particular reference to dogs wherein the upper and lower dog members are slidable vertically.

The general object of the invention is to provide for controlling the operation of one or more dogs upon a log carriage at a point or station remote from the dogs and, at the same time, to effect the gripping of a log or cant by the teeth of the dog without mutilating one face of the last plank or cant.

The above and other objects are accomplished by instrumentalities pointed out in the following specification.

The invention is clearly defined in the claims.

A satisfactory embodiment of the invention is illustrated in the accompanying drawings forming part of the specification and in which—

Figure 1 is a side elevation of the dog of this invention, part of the side plate being broken away to disclose the relation of other parts.

Figure 2 is a front elevation and at right angles to Figure 1 part being shown in section.

Figure 3 is a cross section on the line 3—3 of Figure 1, looking in the direction of the arrows, and Figure 4 is a view similar to Figure 3, on the line 4—4 of Figure 1.

Fig. 5 is a detailed perspective view of the dog guideway.

In the drawings section $a$ of the carriage frame is shown as the support of the head block $b$ upon which is arranged the slidable knee $c$. The dogging device of the present invention is shown as forming part of the standard 5 of the knee $c$, which standard as shown at Figure 3 supports a vertical guideway 6 the base 7 of which is secured in a depression formed in one side of the standard 5 in any preferred manner as by bolts 8.

The upper dog member 9 has a vertical base plate 10, the inner face of which carries a head 11 with outward extensions 12 that are slidable in bearings 13 of guide 6. The bearings 13 are herein shown as resulting from an inturned extension of one of the side walls 14 of the guide 6 and a substantially U-shaped extension on the opposite side wall 15 of the guide. The length of the upper dog member 9 is less than the length of base plate 7 which extends below the supporting surface 16 of the head block, as shown in Figure 1, and a stop 17 is formed by offsetting the side portions 14 and 15 of the guide adjacent to the lower portion of the base plate 7, as shown in Figure 1. The lower offset side portion 18 of the guide is, as shown in Figure 4, provided with an outward extension 19 and the opposite offset side portion 20 is provided with a transverse extension 21. The extensions 19 and 21 form guides and bearing surfaces for the lower dog member 22, the base plate 23 of which has an angular shaped extension 24 on one side embracing the extension 19 and is further provided with a pair of such extensions 24′ and 25 which embrace the transverse extension 21. The connection between all of said extensions is such as to permit the lower dog member 22 to slide vertically on the standard. The upper dog member is provided with a vertical row of teeth indicated generally by 26, the engaging end portions 27 of which are yieldingly held projected beyond the front face 28 of the standard 5. In the embodiment shown in the drawings, the teeth 26 are adapted for engaging with a cant shown by dotted lines and indicated by 29. It will be noted that the engaging end 27 of the uppermost tooth 26 is directed into the upper side portion of the cant 29 so that the indentation left by the engaging end in the cant 29 will be located in the side thereof as distinguished from one of the faces. In this way mutilation of the inner face of the cant 29 will be avoided and the commercial value thereof will not be impaired. The presence of a plurality of teeth 26 arranged in a vertical row, as shown, renders the device of this invention readily adjustable to engage with cants or logs of different widths. Since the teeth 26 are yieldingly held with their engaging ends 27 in projected position, an automatic adjustment of the upper dog member to engage only the upper sides of cants of various widths is permitted.

Referring to Figure 1, it will be noted that when the parts are in the positions as there shown, the cant 29 is engaged by the uppermost tooth 26, while the lower teeth are retracted due to the presence of the cant extending into the paths of movement of the said teeth. This ability on the part of the teeth 26 to yield upon impact with a cant or log is due to the mounting of the said teeth. In carrying out the present invention, the teeth may be operated to slide into projected and retracted positions by suitable mechanical devices, in which case the engaging ends may be extended for various distances beyond the face 28 of the knee c or the teeth may be constructed as shown in the drawings wherein it will be noted that the mass of the upright side portion 30 of each tooth 26 is greater than the outwardly extending engaging end portion 27. In this connection it will be noted that the pivot pin 31 of each tooth passes through an offset side portion 32 of the tooth so that when the uppermost tooth is in the position shown in Figure 1, its center of gravity will be to the left of the pivot 31 and as a consequence the engaging end of the tooth will tend to move outwardly. This tendency to outward movement on the part of the upper tooth in Figure 1, is overcome by the presence of a stop 33 which extends outwardly from the base 10 and intercepts the tooth 26 at the juncture of the side portions 27 and 30. Additional stops 33 are provided for the lower teeth of the row. An inner row of stops 34 are provided for limiting inward movement of the teeth beyond the position shown by dotted lines in Figure 1.

Referring now to Figures 1 to 3, it will be noted that the pivot pins 31 and the stops 33 and 34 may be formed as bosses and integral with the base 10, in which case they may be bored and screw threaded for the reception of fastening screws 35 which operate to secure the outer side plate 36 of the upper dog member. The side plate 36 conforms substantially to the base plate 6 and operates to prevent outward displacement of the dogs and the instrumentalities hereinafter described. A cylinder 37 has its lower end adapted as by being provided by a lug 38 for connection to the lower dog member 22. For this purpose it will be noted by reference to Figure 2, that the lower dog member carries on its outer face a recessed lug 39 which receives the lug 38 of the cylinder, said lugs being apertured to receive a bolt 40. A piston rod 41 extending outwardly from the cylinder has at its inner end the usual piston, not shown, and its outer end is directed upwardly and between the base 10 and outer side plate 36 of the upper dog member to which it is connected by means of a pin or bolt 43 passing through the said plate 36 and the base plate 10. The piston rod and cylinder are so proportioned in point of length as to effect the sliding of the upper dog member for such distances in opposite directions as will enable the upper dog member to engage any of the conventional sizes of cants or logs. In the present instance I have shown the cylinder and its parts as being adapted to be operated by compressed fluid. A pipe 44 for the fluid pressure is connected to a nipple 45 extending upwardly from the upper end portion of the cylinder 37 and a pipe 46 which also carries fluid under pressure, is connected to a nipple 47 extending from the lower end portion of the cylinder 37. The pipes 44 and 46 extend to a control station, not shown, whereat the usual valve devices are arranged for controlling the passage of compressed fluid to the said pipes. With this construction it is obvious that when the parts are positioned as shown in Figure 1, the upper dog member will be moved vertically upward when fluid is entered into the cylinder 37 through the pipe 46. When fluid is entered into the upper end of the cylinder through pipe 44, the upper dog member will be moved vertically downward until one of the teeth 26 engage with the cant or log arranged in its path of movement, at which time the compressed fluid within the cylinder 37 continuing to act will move the said cylinder upwardly and thereby lift the lower dog member 22 until the stationary tooth 48 extending upwardly from the lower dog member engages with the lower side of the cant or log. The tooth 48 is secured in a recess in the outer face of the base 23 of the lower dog member by screws 49.

It will be noted that the peculiar shape of the engaging end portions of the teeth of the upper and lower dog members, permits of these engaging the intervening log or cant for a relatively short distance only, in that the flat areas of the teeth immediately beyond the points thereof prevent entrance of the points upon these flat areas coming into engagement with the log or cant.

Although I have shown and described one embodiment of my invention, it is to be understood that the same is susceptible of various changes; and I reserve the right to employ such as may come within the scope of the appended claims.

I claim:

1. The combination with the knee of a saw mill carriage, of a base plate secured thereto and formed with vertically extending guides, upper and lower dogs slidably cooperating with said guides, the guides being formed to limit the downward movement of the upper dog, a cylinder for the reception of fluid pressure connected to the lower dog, and a piston within said cylinder connected to the upper dog, the upper dog being pivotally supported for limited independent movement.

2. The combination with the knee of a saw mill carriage, of a base plate secured thereto and formed with vertically extending spaced parallel guides, an upper dog unit comprising a plate mounted for interlocking sliding engagement with the guides, a plurality of dogs mounted for limited pivotal play on the plate, a lower dog unit mounted for interlocking sliding engagement with the guides, a cylinder to receive an operating fluid under pressure connected to the lower dog unit and extended in alignment with one of the guides, a piston in the cylinder, and a piston rod connected to the piston and extending beyond the cylinder, the upper end of the rod being connected to the plate of the upper dog unit.

3. The combination with the knee of a saw mill carriage, of a base plate secured thereto, spaced parallel guiding webs extending vertically of the base plate, said webs having end flanges, an upper dog unit comprising a plate formed to slidably interlock with said end flanges, a dog mounted on said plate for limited pivotal play, the end flanges of the webs being relatively offset at a predetermined point in their lengths to limit the downward movement of the plate of the upper dog unit, a lower dog unit comprising a plate having interlocking sliding connection with said flanges below the offset, a dog secured to said plate, and a fluid pressure means including a cylinder and a piston, the cylinder being connected to the plate of the lower dog unit and the piston being connected to the plate of the upper dog unit.

ERVIE A. FERRIS.